United States Patent [19]

Ford et al.

[11] Patent Number: 4,853,861
[45] Date of Patent: Aug. 1, 1989

[54] WINDSHEAR MEASUREMENT SYSTEM

[75] Inventors: Douglas W. Ford, Hillsboro, Oreg.; Walter A. Johnson, San Pedro, Calif.; Shahram Daneshmandi, Portland, Oreg.

[73] Assignee: Flight Dynamics, Inc., Portland, Oreg.

[21] Appl. No.: 92,088

[22] Filed: Sep. 1, 1987

[51] Int. Cl.$^4$ .......................... G01P 5/00; G01P 15/00
[52] U.S. Cl. .............................. 364/424.06; 364/434; 340/968
[58] Field of Search ........... 364/434, 427, 428, 424.06; 340/968, 969, 967; 244/180

[56] References Cited

U.S. PATENT DOCUMENTS

| | | | |
|---|---|---|---|
| 3,662,976 | 5/1972 | Gesler | 244/77 D |
| 3,840,200 | 10/1974 | Lambregts | 244/77 D |
| 3,892,374 | 7/1975 | Lambregts | 244/77 D |
| 4,012,713 | 3/1977 | Greene et al. | 340/27 R |
| 4,079,905 | 3/1978 | Greene | 244/191 |
| 4,133,503 | 1/1979 | Bliss | 364/428 |
| 4,189,118 | 2/1980 | Peter-Contesse | 364/440 X |
| 4,319,219 | 3/1982 | Rein-Westen | 364/428 |
| 4,422,147 | 12/1983 | Hanke | 364/440 |
| 4,485,446 | 11/1984 | Sassi | 364/435 |
| 4,530,060 | 7/1985 | Greene | 364/428 |
| 4,586,140 | 4/1986 | Millen | 364/433 |
| 4,593,285 | 6/1986 | Miller et al. | 364/434 |
| 4,608,641 | 8/1986 | Snell | 364/434 |
| 4,609,987 | 9/1986 | Greene | 364/433 |
| 4,725,811 | 2/1988 | Miller et al. | 340/968 |
| 4,728,951 | 3/1988 | Johnson et al. | 364/434 X |

Primary Examiner—Parshotam S. Lall
Assistant Examiner—Thomas G. Black
Attorney, Agent, or Firm—Stoel Rives Boley Jones & Grey

[57] ABSTRACT

The present invention comprises a system for detecting windshear and associated downdraft effects when they are encountered in flight by an aircraft. The system includes an input unit (12), a first processing unit (14), a second processing unit (16), an output unit (18), and a pilot warning device (20). The input unit receives aircraft performance data from the instruments and/or flight systems on the aircraft and preconditions this data to produce a set of signals corresponding to various aerodynamic and inertial input parameters. The first processing unit differences signals representing the aerodynamically derived and inertially derived accelerations of the aircraft in order to generate windshear signals. These windshear signals are then corrected for pitch rate induced coriolis acceleration effects. The corrected signals are used to form a signals representing longitudinal windshear along the horizontal heading axis of the aircraft and the change in aircraft climb gradient due to longitudinal windshear. The second processing unit difference aerodynamically derived and inertially derived flight path signals to generate a windshear type change in climb gradient signal corresponding to the effects of downdrafts. The output unit sums the change in climb gradient signals to produce an overall aircraft loss of performance signal which it then conditions for threshold detection purposes. This final conditioned signal is furnished to the pilot warning device which provides a visible or audible warning in order to advise the aircraft pilot of potentially hazardous flight conditions. In an alternate embodiment, coriolis acceleration effects are eliminated by forming a signal representing aerodynamically derived acceleration in the horizontal plane. The longitudinal windshear signal is then generated by forming an inertial acceleration signal in the horizontal plane and differencing the respective aerodynamic and inertial acceleration signals.

22 Claims, 6 Drawing Sheets

WINDSHEAR MEASUREMENT SYSTEM

TECHNICAL FIELD

The present invention relates to avionics equipment and more particularly to instrumentation for detecting windshear as it may be encountered by an aircraft in flight.

BACKGROUND OF THE INVENTION

Windshear is a phenomenon involving changing wind conditions in which wind velocity and direction may vary substantially over short distances or short time intervals. Windshears can result in hazardous flight conditions for aircraft during takeoff and on approach for landing. For example, a rapidly decreasing head wind may cause significant loss of lift which can be dangerous if the aircraft's airspeed is low or the aircraft's angle of attack is high as are both usually the case for an aircraft when landing. Further, the situation may be rendered more serious by the effects of sudden downdrafts which often accompany windshears and which diminish the climb capabilities of the aircraft. Therefore, it is highly desirable to develop accurate systems for detecting windshear and downdraft conditions so that the aircraft pilot can be warned to break off a land approach before the situation becomes critical.

Some systems of limited capability have been designed in the past to detect windshear. U.S. Pat. Nos. 4,012,713 and 4,079,905 to Greene describe a windshear detection system which uses airspeed, pitch attitude, and inertial acceleration signals to develop a windshear-type signal by differencing aerodynamically developed and inertially sensed accelerations. However, this system does not fully account for the effects of sensor dynamics, and does not distinguish between the true vertical and horizontal components of a windshear. Further, the system disclosed in the patents to Greene does not adjust the windshear signal for the effects of coriolis accelerations or for the effects of aircraft maneuvers.

U.S. Pat. No. 3,892,374 to Lambregts and U.S. Pat. No. 3,662,976 to Gesler also disclose systems which may be used for windshear detection in connection with throttle control devices. However, these systems are basic in design and include only the necessary components for differencing the derivative of aircraft airspeed error with forward acceleration and, in the Lambregts case, certain filtering and rate limiting circuitry appropriate for the throttle control applications.

It is, therefore, an object of the present invention to provide a windshear detection system having greater accuracy, better reliability, and improved response time.

It is also an object of the present invention to provide such a system in which windshear signals are corrected for pitch rate induced coriolis accelerations to properly distinguish between vertical and horizontal windshear effects along the heading axis of the aircraft.

It is another object of the present invention to provide such a system that develops accurate input parameters and in which signals that are to be combined together are appropriately filtered to preserve their proper phase relationships.

It is a further object of the present invention to generate a loss of performance signal that is related to windshear and which includes the effects of vertical winds.

SUMMARY OF THE INVENTION

The present invention comprises a windshear detection system having several subsystems including an input unit for providing required input signals, a first processing unit for computing a longitudinal windshear signal, a second processing unit for computing a climb gradient signal, and an output unit for forming a loss of performance indicator from the windshear signals.

The input unit receives signals representing various aircraft performance parameters such as angle of attack, true airspeed, pitch attitude, pitch rate, roll angle, roll rate, yaw rate, vertical velocity, downward acceleration, and forward acceleration and supplies appropriately preconditioned input signals to the processing units based on these performance parameters. The first processing unit differences the various aerodynamic and inertial signals corresponding to downward and forward accelerations in order to compute signals representing forward and downward windshear. The first processing unit also corrects these windshear signals for any downward and forward coriolis accelerations due to the pitch rate of the aircraft and develops a signal representing windshear along the horizontal heading axis of the aircraft with respect to the geotropic frame of reference. The second processing unit uses aerodynamically and inertially derived input signals to calculate a climb gradient signal corresponding to the loss of climb capability of the aircraft due to downdrafts. The output unit combines the heading axis windshear and climb gradient signals to form a loss of aircraft performance signal that the output unit conditions in a manner that is appropriate to the application for which the signal is employed. Visible and/or audible warnings may be provided to the aircraft pilot whenever the magnitude of the conditioned loss of performance signal exceeds a predetermined threshold value.

In an alternate embodiment, the first and second processing units are combined into a single subsystem. In this subsystem, acceleration components due to coriolis effects are eliminated from the aerodynamic airspeed signal by forming a signal representing only a horizontal component of acceleration which is then differentiated to yield a horizontally stabilized aerodynamic acceleration signal. Further, the downward and forward inertial acceleration signals are combined to form a single signal representing the horizontal component of the inertial acceleration of the aircraft. The longitudinal windshear is then generated by differencing the respective signals representing aerodynamic and inertial accelerations in the horizontal plane defined in the geotropic frame of reference.

DESCRIPTION OF PREFERRED EMBODIMENT

Figure 1:
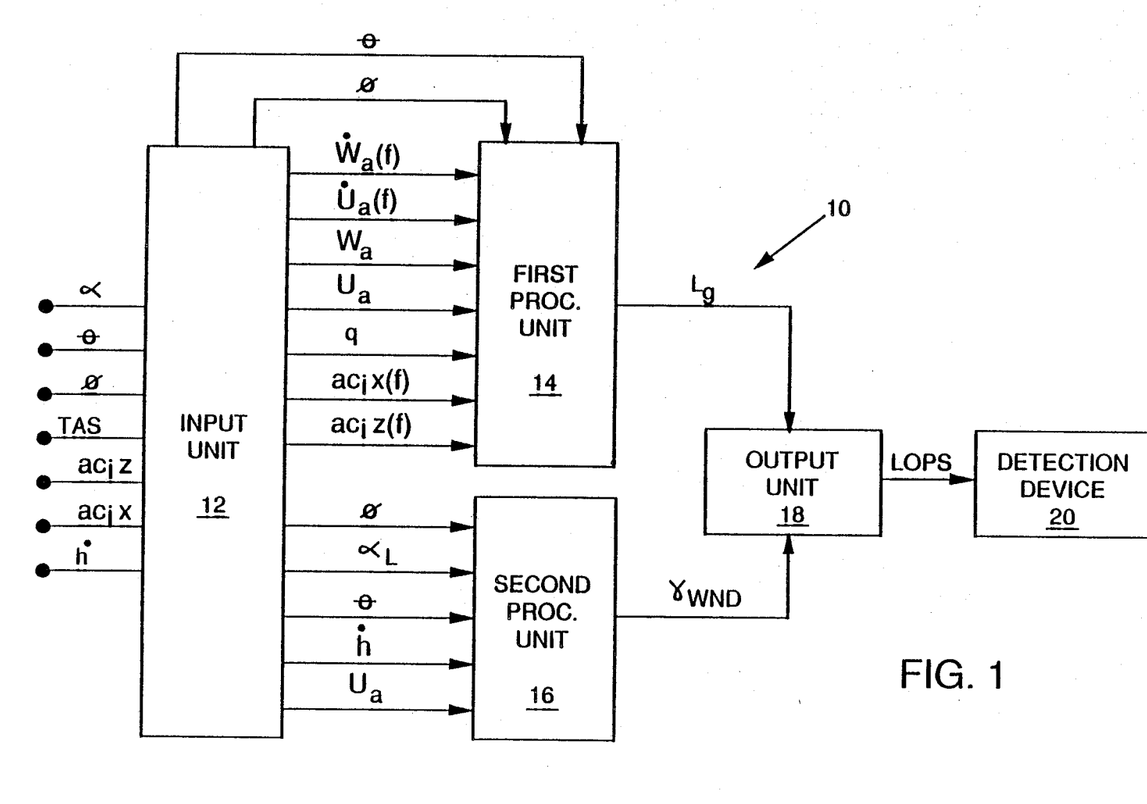
FIG. 1 shows a block diagram of the overall system of the present invention.

Referring now to FIG. 1, a block diagram is shown of the overall system 10 of the present invention as it may be divided into basic subsystems. The system 10 includes an input unit 12 for calculating and preconditioning input signals. The system 10 also includes a first processing unit 14 that employs certain aerodynamic and inertial signals supplied by the input unit 12 for computing and adjusting a signal corresponding to longitudinal windshear, and a second processing unit 16 that employs certain other aerodynamic and inertial signals supplied by the input unit 12 for computing a signal corresponding to the climb gradient effects of vertical winds on the climb capabilities of the aircraft. The system 10 further includes an output unit 18 for combining the windshear and climb gradient signals to form a loss of performance signal. A detection device 20 may further process the loss of performance signal to generate a conditioned loss of performance signal suitable for detection pursuant to providing a warning to an aircraft pilot.

Table I below provides a listing of the symbols employed for the signals described in greater detail hereinafter along with a set of abbreviated definitions of the aerodynamic and inertial parameters that correspond to these signals. The raw input parameters supplied to the input unit 12 include angle of attack, pitch attitude, roll angle, pitch rate, true airspeed, downward inertial acceleration, forward inertial acceleration, and vertical velocity and may also include the roll rate and yaw rate.

TABLE I

| | | | |
|---|---|---|---|
| (f) | indicates a filtered signal | $WSH_D$ | downward windshear |
| $\alpha$ | angle of attack | $WSH_F$ | forward windshear |
| $\Theta$ | pitch attitude angle | $WSHC_D$ | coriolis acceleration corrected downward windshear |
| $\alpha L$ | $\alpha$ as limited to $\pm \pi/8$ | $WSHC_F$ | coriolis acceleration corrected forward windshear |
| $\Phi$ | roll angle | | |
| TAS | measured true airspeed | L | longitudinal (horizontal heading axis) windshear |
| $W_a$ | downward airspeed | | |
| $\dot{W}_a$ | downward aerodynamic acceleration | $L_g$ | change in climb gradient due to longitudinal windshear |
| $ac_iz$ | downward inertial acceleration | $\gamma a$ | aerodynamic flight path angle |
| $ac_ix$ | forward inertial acceleration | $\gamma_i$ | inertial flight path angle |
| q | body axis pitch rate | $\gamma_{wnd}$ | change in climb gradient due to vertical winds |
| $U_a$ | forward airspeed | LOP | loss of performance |

TABLE I-continued

| | | | |
|---|---|---|---|
| $U_a$ | forward aerodynamic acceleration | LOPC | (LOP) indicator specially conditioned LOP indicator |
| h | vertical velocity (inertial) | | |
| $pa_D$ | downward coriolis acceleration | | |
| $pa_F$ | forward coriolis acceleration | LOPCL | conditioned LOP indicator as rate limited |
| LOPS | scaled LOP indicator | $U_{HOR}$ | horizontal aerodynamic airspeed |
| LOPL | limited LOP indicator | $ac_iH$ | inertial acceleration in heading axis |
| LOPC | conditioned LOP indicator | | |

The signals representing these parameters are generally supplied to the input unit 12 from the inertial navigation system and/or the air data computer of the aircraft. The vertical velocity signal should represent a combination of the outputs from a downward accelerometer and a barometric altimeter as provided by a complementary indicator filter. Alternately, the input parameters may be taken directly from the actual sensory instruments which are mounted in and on the aircraft. These instruments would generally include a wind vane, one or more gyroscopes, a pitot tube, downward and forward accelerometers and a barometric altimeter.

In the event that signals taken directly from the sensory instruments are used or, if the signals produced by the inertial navigation system or air data computer are not fully processed, the raw input signals may have to be corrected for certain types of inherent errors. In particular, the angle of attack signal should be processed to reduce flow-field distortions associated with most wind vanes. The inertial acceleration signals must be processed to eliminate accelerations due to gravity equal to $g \cos \theta$ (downward signal) and $g \sin \theta$ (forward signal) in which g represents gravitational acceleration and $\theta$ represents the pitch attitude signal.

Further, it may also be desirable to correct the signals from the accelerometers for the positioning of these instruments with respect to the aircraft's center of gravity and the associated effects of centripetal and/or tangential acceleration due to body pitch rate, roll rate, and yaw rate. The wind vane signal should also be corrected for the position of the vane relative to the aircraft's center of rotation and the resulting effects of air currents on the vane during aircraft body pitching.

Additionally, the input signals corresponding to a particular sample time should be corrected for the differing response characteristics of the various sensing instruments. In particular, most pitot tubes used in combination with an air data computer have about a 300 msec. lag in response to actual airspeed conditions. Consequently, the other input signals may have to be delayed up to 250 msec. through the use of delayers such as Pade' filters in order to ensure that proper timing and phase relationships are preserved between the signals.

Figure 2:
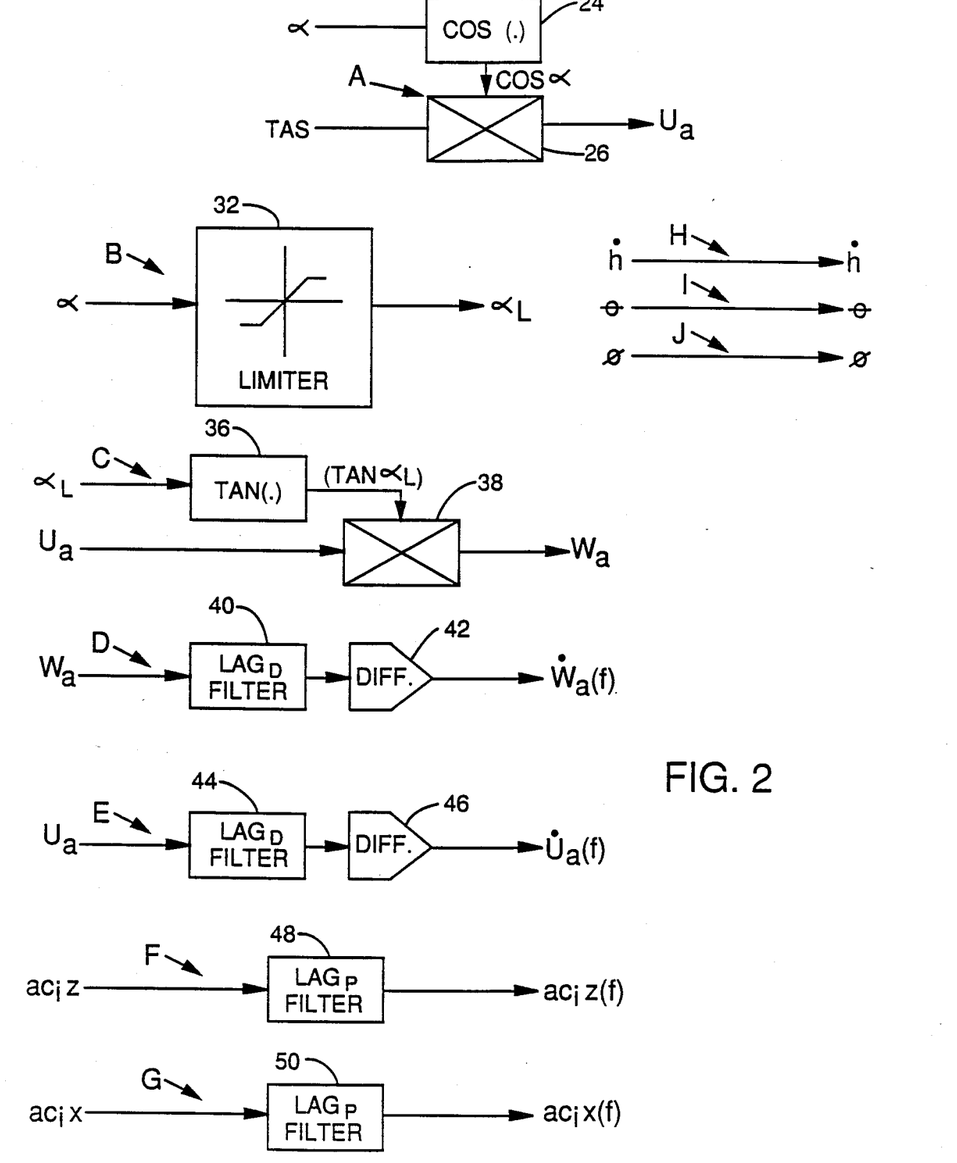
FIG. 2 shows a block diagram of the input unit of the present invention.

Referring now to FIG. 2, the input unit 12 is shown in greater detail. The input unit 12 includes ten separate components A–J for providing the exact input signals required by the first and second processing units 14 and 16. The component A includes the cosine function circuit 24 and the multiplication circuit 26. The cosine function circuit 24 receives the aircraft angle of attack signal α and generates a signal corresponding to the cosine of this angle. The multiplication circuit 26 multiples the measured true airspeed signal TAS by the signal corresponding to the cosine of the angle of attack generated by circuit 24 and, thereby, generates the signal $U_a$ representing the forward body axis airspeed of the aircraft as derived from aerodynamic parameters.

The component B comprises the limiter circuit 32. The limiter circuit 32 limits the signal corresponding to angle of attack of the aircraft to a selected range (e.g. $\pm\pi/8$ radian) and provides an angle of attack (limited) signal αL directly corresponding to he angle of attack signal α but limited to the range stated.

The component C comprises the tangent function circuit 36 and the multiplier circuit 38. The tangent function circuit 36 receives the angle of attack (limited) signal $\alpha_L$ and generates a signal corresponding to the tangent of this angle. The multiplier circuit 38 multiplies this signal by the signal $U_a$ corresponding to forward airspeed in order to produce a signal $W_a$ corresponding to downward airspeed of the aircraft as derived from aerodynamic parameters.

The component D includes the filter circuit 40 and the differentiator circuit 42. The filter circuit 40 operates to filter out high frequency noise from the signal $W_a$ representing aerodynamic downward airspeed, thereby providing the signal $W_2(f)$ (the symbol (f) indicates that the signal $W_a$ has been filtered). The differentiator circuit 42 generates a signal $\dot{W}_a(f)$ corresponding to the time deriviative of the downward airspeed $W_a(f)$ and, therefore, the downward acceleration of the aircraft as aerodynamically determined.

The component E includes the filter circuit 44 and the differentiator circuit 46. The filter circuit 44 operates to filter out high frequency noise from the signal $U_a$ representing the aerodynamic forward airspeed. The differentiator circuit 46 generates a signal $\dot{U}_a(f)$ corresponding to the time derivative of the forward airspeed signal $U_a(f)$ and, therefore, the forward acceleration of the aircraft as aerodynamically determined.

The components F and G comprise the filter circuits 48 and 50, respectively. The filter circuit 48 produces the inertially derived downward acceleration signal $ac_iz(f)$ by filtering out high frequency noise in the downward acceleration signal $ac_iz$. The filter circuit 50 produces the inertially derived forward acceleration signal $ac_ix(f)$ by filtering out high frequency noise in the signal $ac_ix$. The filter circuits 40, 44, 48, and 50 are designed to equalize the phase relationships between the filtered signals $\dot{W}_a(f)$, $\dot{U}_a(f)$, $ac_ix(f)$, and $ac_iz(f)$. For this purpose, the circuits 48 and 50 are specifically designed to compensate for time delays or phase changes introduced by the differentiators 42 and 46.

The components H, I and J simply transmit the vertical inertial velocity signal h, the pitch angle attitude signal $\theta$, and the roll angle signal $\phi$, and are included merely to indicate the availability of these signals to the processing units 14 and 16.

Figure 3:
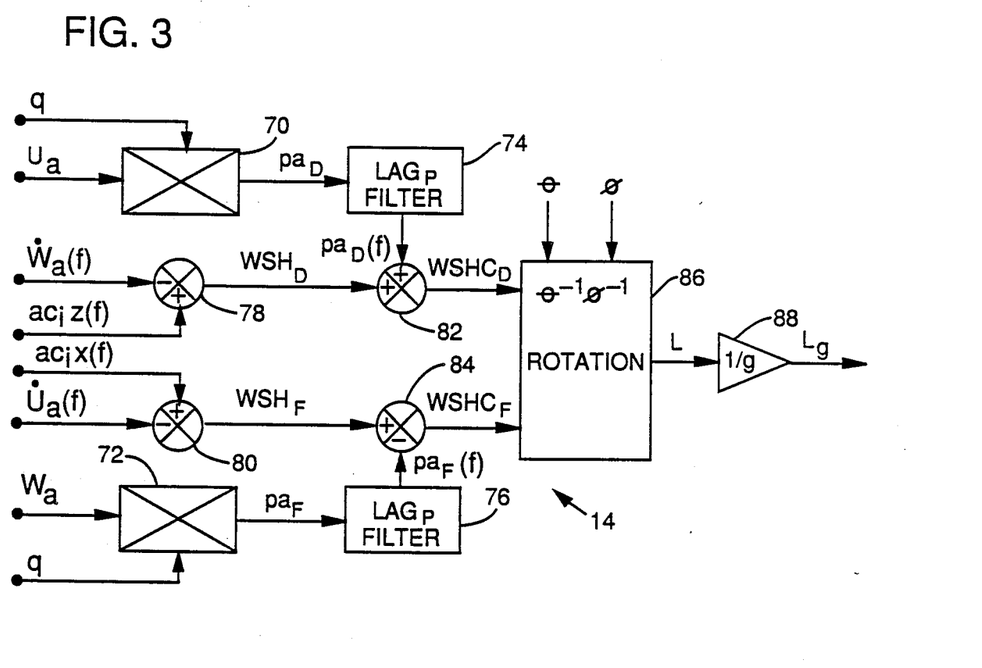
FIG. 3 shows a block diagram of the first processing unit of the present invention for generating a longitudinal windshear signal.

Referring now to FIG. 3, the first processing unit 14 is illustrated in greater detail. The first processing unit 14 comprises the multiplier circuits 70 and 72, the filter circuits 74 and 76, the adder circuits 78, 80, 82, and 84, the angular rotation circuit 86 and the amplifier circuit 88. The adder circuits 78 and 80 function in parallel to subtract the signals $\dot{W}_a(f)$ and $\dot{U}_a(f)$ from the signals $ac_iz(f)$ and $ac_ix(f)$, respectively, thereby generating downward windshear $WSH_D$ and $WSH_F$ correspond to the difference in the body axis coordinate system of the aircraft between the inertially derived acceleration of the aircraft and the aerodynamically determined acceleration of the aircraft both in the forward and downward directions.

However, certain corrections must be made to the signals $WSH_D$ and $WSH_F$ to account for coriolis-type accelerations produced with respect to frames of reference that are simultaneously translating and rotating, such as the body reference frame of an in-flight aircraft during changes in pitch attitude. In the present case, these cariolis accelerations incorporate the body axis pitch rate q and are approximately equal to the product q x $U_a$ in the downward direction and the product q x $W_a$ in the forward direction. These products are calculated by the respective multiplication circuits 70 and 72. The circuits 70 and 72 generate the signals $pa_D$ and $pa_F$, respectively, corresponding to downward and forward coriolis accelerations. The filter circuits 74 and 76 filter the respective signals $pa_D$ and $pa_F$ to reduce high frequency noise. The filter circuits 74 and 76 also help to equalize the phase relationship between the filtered signals $pa_D(f)$ and $pa_F(f)$ and the windshear signals $WSH_D$ and $WSH_F$ in view of the effects of the filters 40, 44, 48, and 50. The adder circuit 82 adds the filtered downward coriolis acceleration signal $pa_D(f)$ to the downward windshear signal $WSH_D$ to generate a signal $WSHC_D$ corresponding to downward windshear as corrected for any pitch rate induced coriolis acceleration. The adder circuit 84 subtracts the filtered forward coriolis acceleration signal $pa_f(f)$ from the forward windshear signal $WSH_F$ to generate a signal $WSHC_F$ corresponding to forward windshear as corrected for any pitch rate induced coriolis acceleration.

The signals $WSHC_D$ and $WSHC_F$ define windshear in the respective downward and forward directions with respect to the body axis of the aircraft. However, windshear along the heading axis of the aircraft in the horizontal plane with respect to the earth as a frame of reference (geotropic frame of reference) is of greatest interest for limiting-case aircraft control purposes. This type of windshear along the horizontal heading axis of the aircraft may be alternately described as "longitudinal" windshear. The angular rotation circuit 86 receives the signals $WSHC_D$ and $WSHC_F$ which represent the respective downward and forward vector components of windshear in the aircraft body axis frame of reference, and calculates the value of the longitudinal windshear L by "vector rotation" of the quantities $WSHC_D$ and $WSHC_F$ to the heading axis along the horizontal plane in the geotropic frame of reference. A single windshear signal L representing a vector quantity along the horizontal heading axis of the aircraft in the horizontal plane is thereby formed. This calculation may be accomplished through the use of the Euler rotation matrix whereby the horizontal heading axis components of the body axis vectors $WSHC_D$ and $WSHC_F$ may be computed and summed together. For present purposes, however, these calculations may be simplified in accordance with the following formula:

$$L = \cos\theta \times WSHC_F + \sin\theta \times \cos\phi \times WSFC_D.$$

Figure 5:
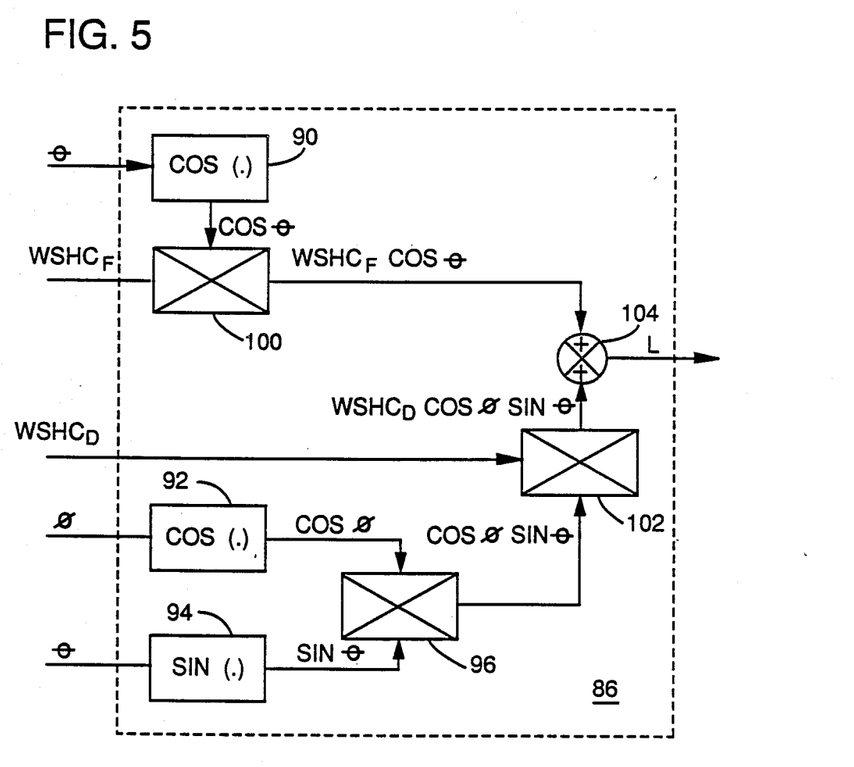
FIG. 5 shows a block diagram of the angular rotation circuit of the first processing unit of the present invention.

FIG. 5 illustrates the components required to implement this formula. The trigometric function circuits 90, 92, and 94 provide signals corresponding to $\cos\theta$, $\cos\phi$, AND $\sin\theta$, respectively, from the signal representing pitch attitude and the signal representing roll angle. The multiplier circuit 96 forms a product signal corresponding to $\cos \phi \times \sin \theta$ from the outputs of the trigonometric circuits 92 and 94. The multiplier circuits 100 and 102 form signals corresponding to the products $WSHC_F \times \cos \theta$ and $WSHC_D \times \cos \phi \times \sin \theta$, respectively, from the outputs of the circuits 90 and 96 and the input signals $WSHC_F$ and $WSHC_D$. Finally, the adder circuit 104 sums the signals $WSHC_F \times \cos \theta$ and $WSHC_D \times \cos \phi \times \sin \theta$ to generate the longitudinal windshear signal L.

Referring now back again to FIG. 3, the longitudinal windshear signal L is supplied to the amplifier circuit 88. The amplifier circuit 88 scales the longitudinal windshear signal L in accordance with the gravitational $L_g$ in radians which represents a change in the angular climb gradient of the aircraft. Positive values of the signal $L_g$ may be understood as corresponding to a loss of climb capability by the aircraft due to longitudinally changing wind conditions (longitudinal windshear).

Figure 4:
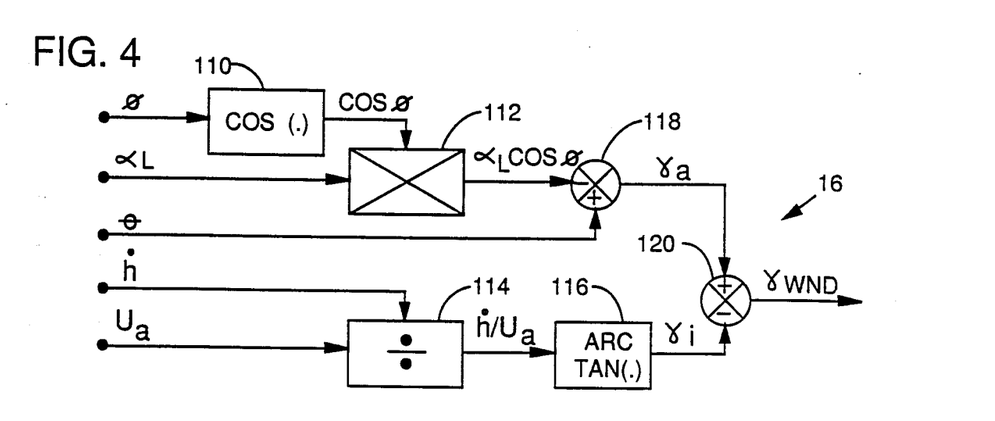
FIG. 4 shows a block diagram of the second processing unit of the present invention for generating a climb gradient signal.

Referring now to FIG. 4, the second processing unit 16 is shown in greater detail. The second processing unit 16 includes the cosine function circuit 110, multiplier circuit 112, divider circuit 114, arctangent function circuit 116, and the adder circuits 118 and 120. The cosine function circuit 110 generates a signal corresponding to the cosine of the roll angle from the signal $\phi$ representing the roll angle. The multiplier circuit 112 forms the product of this roll angle cosine signal generated by circuit 110 with the signal $\alpha_L$ representing the angle of attack (limited). The resultant product signal represents the angle of attack as corrected for the effects of the roll angle of the aircraft. This output signal from the multiplier circuit 112 is then differenced in adder circuit 118 with a signal $\theta$ representing the pitch attitude of the aircraft. The resultant signal $\alpha_a$ produced by the adder circuit 118 represents the flight path angle of the aircraft as aerodynamically determined. The signal $\alpha_a$ may be understood as corresponding to the flight path of the aircraft arising as a result of aircraft maneuvers and movement of the airmass in which the aircraft is flying.

The divider circuit 114 forms a quotient by dividing the signal $\dot{h}$ which representing the inertially (and barometrically) derived vertical velocity by the signal $U_a$ which represents the forward airspeed of the aircraft. This quotient is a hybrid of inertial and aerodynamic parameters but in practice primarily reflects inertial parameters. The arctangent function circuit 116 generates a signal $\alpha_i$ which represents the angular flight path as inertially determined from the output of the divider circuit 114. The signal $\alpha_i$ may be understood as corresponding to the flight path of the aircraft arising from aircraft maneuvers.

The adder circuit 120 generates a windshear type signal $\alpha_{wnd}$ that corresponds to the difference between the signals $\alpha_i$ and $\alpha_a$. The signal $\alpha_{wnd}$ may be considered to effectively represent the change in the angular climb gradient of the aircraft arising from the effects airmass movements or vertical winds.

Figure 6:
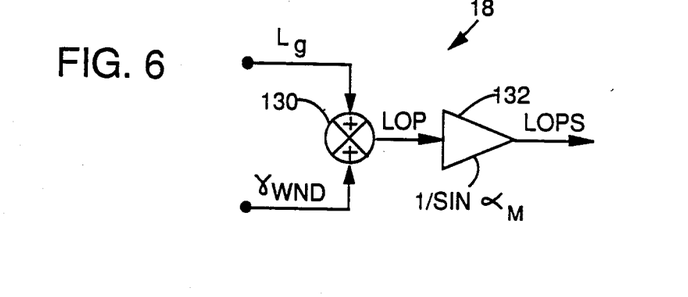
FIG. 6 shows a block diagram of the output unit of the present invention for forming the final loss of performance signal.

Referring now to FIG. 6, the output unit 18 is shown in greater detail. The output unit 18 includes the adder circuit 130 and the amplifier circuit 132. The adder circuit 130 sums the signals $L_g$ and $\alpha_{wnd}$ representing the change in the aircraft's climb gradient due to longitudinal windshear and the change in the aircrafts' climb gradient due to vertical winds, respectively, and generates a signal LOP corresponding to overall loss of aircraft performance. The signal LOP is supplied as an input to the amplifier 132 which scales the signal in terms of the maximum climb capability of the aircraft which may be expressed as $\sin \alpha_m$, where $\alpha_m$ is the maximum climb angle of which the aircraft is capable. The amplifier circuit 132 generates, therefore, a scaled loss of performance signal LOPS which is a measure of windshear in terms of the aircraft's specific climb capabilities. The signals LOP and/or LOPS may be employed for various purposes such as autopilot inputs, automatic throttle control or for pilot warning of loss of performance due to windshear related conditions.

Figure 8:
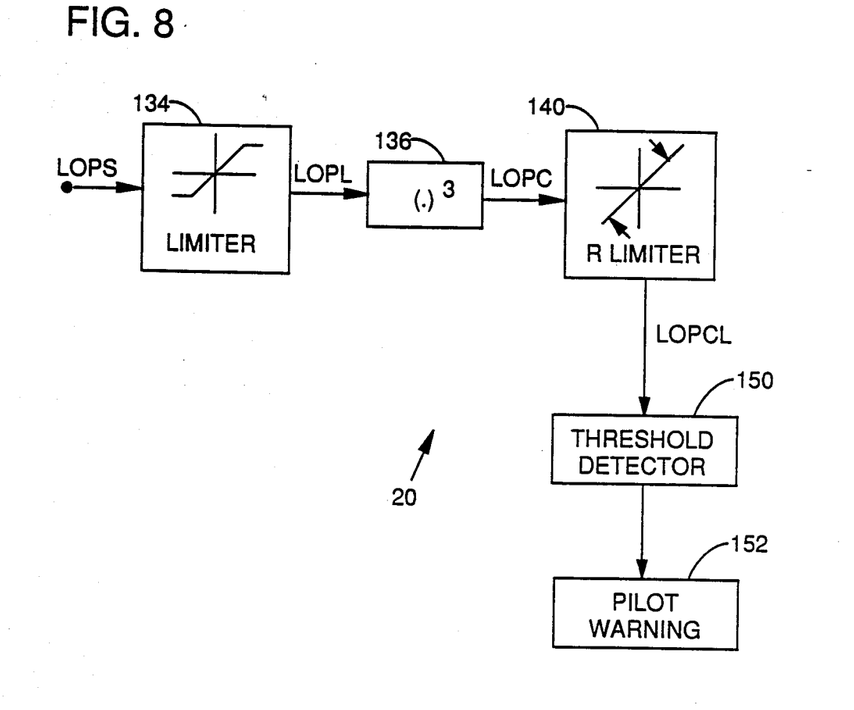
FIG. 8 is a block diagram of a windshear detection unit for processing the loss of performance signal and alerting an aircraft pilot when the loss of performance signal exceeds a set threshold.

Referring now to FIG. 8, detection and pilot warning device 20 is illustrated in detail. The device 20 includes the limiter circuit 134, the power function circuit 136, the rate limiter circuit 140, the threshold detector circuit 150, and the pilot warning device 152. The scaled loss of performance signal LOPS is provided to the limiter circuit 134. The limiter circuit 134 limits the voltage magnitude of the signal LOPS to a specific range in order to help avoid "wind up" of the signal LOPCL (generated by the rate limiter 140, as described below in greater detail) which would negatively impact the response time of the system under rapidly changing conditions. The resultant output signal LOPL from the limiter circuit 134 is supplied to the power function circuit 136 where the signal is multiplied by itself three times (i.e., cubed) in order to generate a conditioned loss of performance signal LOPC. The signal LOPC is optimized in amplitude to provide an especially sensitive response to windshear related conditions as they approach the aircraft's maximum inherent climb capabilities. The LOPC signal is supplied from the power function circuit 136 to the rate limiter circuit 140. The circuit 140 limits the rate at which the signal LOPC can vary and therefore functions to generate the signal LOPCL that is constrained by the amount it can change value over any given time interval.

The signal LOPCL generated by the circuit 140 is supplied to the threshold detector 150. The threshold detector 150 would be used to activate a pilot warning device 152 such as a light or buzzer whenever LOPCL is greater than or is less than a predetermined value indicating when the aircraft is in a dangerous windshear type situation.

The predetermined threshold value for the detector component 150 should be set high enough to avoid frequent false alarms due to wind gusts. However, the threshold values should not be set so high as to unduly delay the warning given to the aircraft pilot. As yet, very little reliable information exists concerning the probabilities of occurrence of wind gusts which may cause false alerts or warnings at low threshold levels. Nevertheless, it is believed that such wind gust events may have substantial probabilities of occurrence and, therefore, the threshold values should be set relatively high.

Figure 7A:
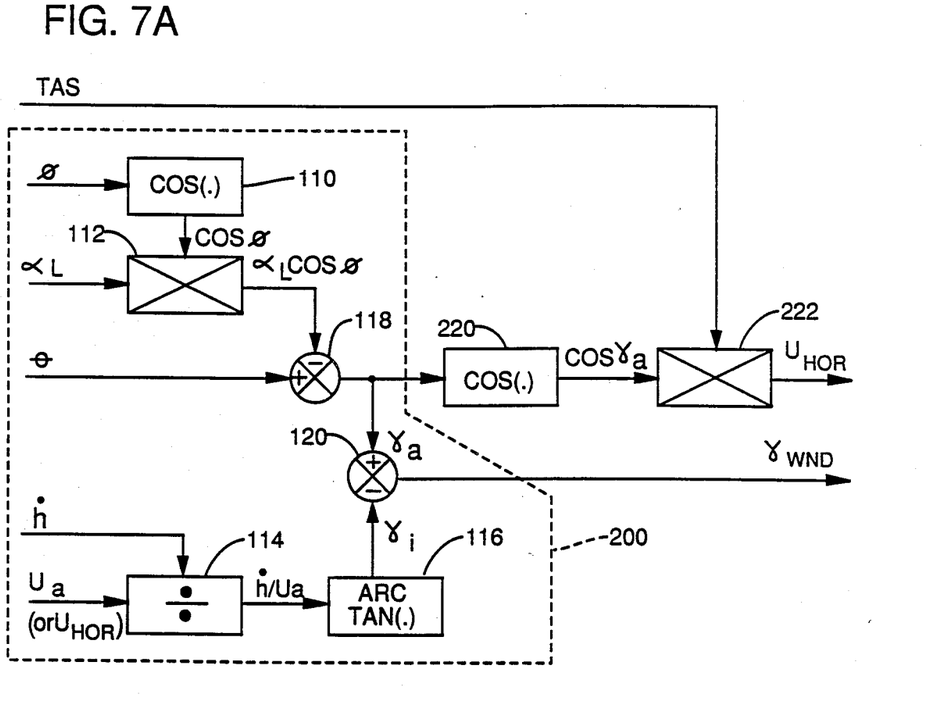
FIGS. 7A and 7B show block diagrams of different parts of an alternate embodiment of the present invention in which the first and second processing units are combined into a single unit.
Figure 7B:
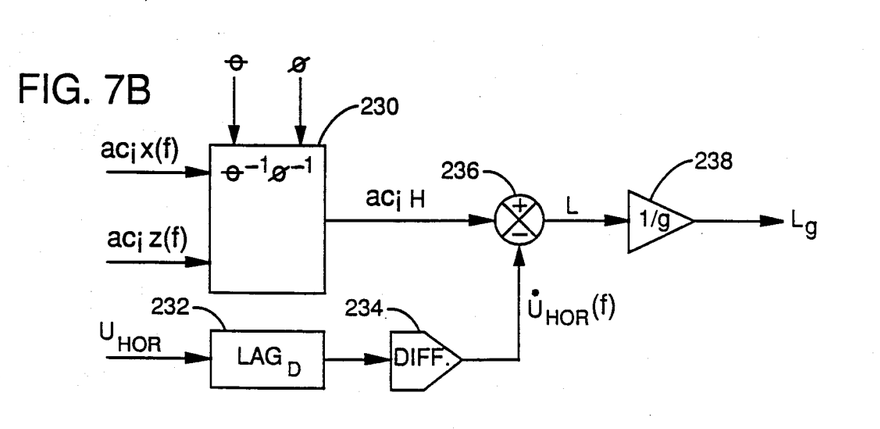

Referring now to FIGS. 7A and 7B, an alternate embodiment of the present invention is shown. In this alternate embodiment, the first and second processing units 14 and 16 of FIG. 1 are combined into a single unit, separate parts of which are shown in FIGS. 7A and 7B. Referring now specifically to FIG. 7A, the component 200 (shown in phantom) is equivalent to the second processing unit 16 with the circuits 110-120 directly corresponding to the circuits having the same reference numbers in FIG. 4. The component 200 produces the same signal $\alpha_{wnd}$ (representing a change in climb gradient being experienced by an aircraft due to vertical winds) as does the processing unit 16. However, as further shown in FIG. 7A the signal $\alpha_a$ generated by circuit 118 and representing the aerodynamic flight path climb gradient is also supplied to a cosine function circuit 220. The cosine function circuit 220 operates to form a signal corresponding to the cosine of the angle represented by the aerodynamic flight path. The aerodynamic flight path may be understood as the angle which the relative wind experienced by the aircraft makes with the horizontal plane in the geotropic frame of reference. the signal cos $\alpha_a$ represents, therefore, the cosine of the angle between the direction of the airspeed vector and the horizontal direction in the inertial (geotropic) frame of reference. The circuit 222 multiplies this signal by the true airspeed signal TAS to generate a signal $U_{HOR}$ representing the horizontal airspeed of the aircraft along its heading axis as aerodynamically derived. This signal $U_{HOR}$ is defined and "stabilized" with respect to the horizontal direction in the inertial frame. Consequently, the signal $U_{HOR}$ is independent of effects due to rotation of the aircraft and does not have to be corrected for coriolis accelerations.

Referring now to FIG. 7B, the component 230 is equivalent to the angular rotation circuit 86 of FIG. 3 and includes circuits similar to those shown in FIG. 5. However, the component 230 receives the forward and downward acceleration signals $ac_iX$ and $ac_iZ$ and provides an output signal $ac_iH$ representing the inertial acceleration of the aircraft along its heading axis in the horizontal plane with respect to the geotropic frame of reference. The filter circuit 232 functions to supress high frequency noise in the signal $U_{HOR}$ representing the horizontal airspeed, and operates in conjunction with the differentiation circuit 234 to generate a signal $\dot{U}_{HOR}(f)$ representing the aerodynamic acceleration of the aircraft along its heading axis in the horizontal plane with respect to the geotropic frame of reference. The signals $ac_iH$ and $\dot{U}_{HOR}(f)$ are supplied to the adder circuit 236. The adder circuit 236 differences the two signals representing the aerodynamically and inertially measured accelerations of aircraft along its horizontal heading axis. The adder circuit 236 thereby generates the signal L representing longitudinal windshear which is then scaled by the amplifier circuit 238 in radians. The final product is the signal $L_g$ which represents the change in the angular climb gradient of the aircraft due to longitudinal windshear and is virtually identical to the signal $L_g$ as generated by the first processing unit 14 of FIG. 1. The alternate embodiment thereby provides a different mechanization in which corrections for the coriolis effect are avoided by transforming the airspeed signals directly into the geotropic frame of reference. Among other things, this mechanization allows several circuits to be eliminated from the input unit 12 including components C, D, E and further eliminates the necessity for separately processing the downward acceleration signal $\dot{W}_a(f)$ and the downward windshear signals $WSH_D$ and $WSHC_D$.

As may be apparent with with respect to the preceding description, certain changes may be made in the above constructions without departing from the scope of the invention. Therefore, the embodiment described and the drawings are intended to be illustrative in nature and are not meant to be interpreted as limiting the following claims.

We claim:

1. A system for generating a signal indicative of a windshear condition encountered by an aircraft, comprising:

an input unit for providing signals representing:
  a. aerodynamic downward airspeed,
  b. aerodynamic forward airspeed,
  c. inertial downward acceleration,
  d. inertial forward acceleration,
  e. aircraft pitch attitude and pitch attitude rate of change, and
  f. aircraft roll angle, said input unit also including means for generating signals corresponding to aerodynamically derived downward and forward accelerations by differentiating said downward and forward airspeed signals, respectively; and a first signal processing unit, including:
  a. means for generating signals corresponding to downward and forward coriolis accelerations by separately multiplying said aircraft pitch attitude rate of change signal by said forward airspeed and said downward airspeed signals, respectively,
  b. means for generating signals corresponding to downward and forward windshear by, respectively, differencing said aerodynamically derived downward acceleration signal and said inertial downward acceleration signal and differencing said aerodynamically derived forward acceleration signal and said inertial forward acceleration signal,
  c. means for generating coriolis acceleration-corrected downward and forward windshear signals by, respectively, summing said downward coriolis acceleration signal and said downward windshear signal and differencing said forward coriolis acceleration signal and said forward windshear signal,
  d. means for calculating from said corrected downward and forward windshear signals a longitudinal windshear signal corresponding to a windshear component in a horizontal plane along a heading axis of the aircraft, and
  e. means for calculating from said longitudinal windshear, pitch attitude, and roll angle signals a signal representing a change in climb gradient of the aircraft due to said longitudinal windshear.

2. The system of claim 1, wherein said aircraft in flight is characterized by an inertial vertical velocity and an angle of attack and wherein said input unit also provides signals representing said inertial vertical velocity and said angle of attack, the system further comprising:

a second signal processing unit, including:
  a. means for generating a signal that corresponds to an aerodynamic flight path of the aircraft and represents a difference between said pitch attitude signal and a product signal formed by multipling said angle of attack signal and a signal corresponding to the cosine of the roll angle,
  b. means for generating a signal corresponding to said inertial flight path of the aircraft by calculating a quotient signal representing the ratio of said vertical inertial velocity signal and said aerodynamic forward airspeed signal,
  c. means for generating a windshear related signal corresponding to a change in climb gradient associated with the effects of vertical winds by differencing said inertial flight path signal and said aerodynamic flight path signal; and an output unit for generating a signal representing an overall loss of performance of the aircraft, said output unit having means for adding said signal representing said change in climb gradient due to longitudinal windshear and said signal representing said change in climb gradient due to vertical winds, thereby to generate a loss of performance signal representing the effects of of vertical winds and longitudinal windshear on said aircraft.

3. The system of claim 1, wherein said aircraft in flight is characterized by an angle of attack and wherein said input means further includes:
   means for providing a tangent signal corresponding to the tangent of said angle of attack and for multiplying said tangent signal by said aerodynamic forward airspeed signal to form said downward aerodynamic airspeed signal.

4. The system of claim 2 wherein said output means further includes:
   means for limiting said loss of performance signal within a predetermined range, and
   means for processing said loss of performance signal in accordance with a power function in order to form a corrected loss of performance signal optimized for threshold detection purposes.

5. An avionics system for detecting windshear and related downdraft conditions encountered by an aircraft that is characterized in flight by a downward acceleration, a forward acceleration, and a pitch rate, comprising:
   means for generating a downward windshear signal corresponding to a difference between an aerodynamically derived downward acceleration and an inertially derived downward acceleration of said aircraft;
   means for generating a forward windshear signal corresponding to a difference between an aerodynamically derived forward acceleration and an inertially derived forward acceleration of said aircraft;
   means for correcting said downward and forward windshear signals to account for downward and forward pitch rate induced coriolis accelerations; and
   means for generating from said corrected downward and forward windshear signals a longitudinal windshear signal corresponding to windshear along a heading axis of said aircraft.

6. The system of claim 5, wherein said aircraft in flight is characterized by an angle of attack and an aerodynamic forward airspeed, and said means for generating a downward windshear signal includes:
   means for providing a tangent signal corresponding to the tangent of said angle of attack of said aircraft and for multiplying said tangent signal by a signal representing said aerodynamic forward airspeed of said aircraft to form an aerodynamic downward airspeed signal, and
   means for differentiating said aerodynamic downward airspeed signal to form a signal corresponding to said aerodynamically derived downward acceleration.

7. The system of claim 5, wherein said aircraft in flight is characterized by a flight path, the system further including:
   means for generating a signal that corresponds to a difference between an aerodynamically derived flight path and an inertially derived flight path and that represents a change in climb gradient due to vertical winds;
   means for transforming said longitudinal windshear signal into a signal representing a change in aircraft climb gradient due to said longitudinal windshear; and
   means for combining said signals representing changes in aircraft climb gradient due to vertical winds and longitudinal windshear, thereby to form an overall aircraft loss of performance signal.

8. The system of claim 7, wherein said aircraft in flight is characterized by a roll angle, an angle of attack, and a pitch attitude, and said means for generating a signal representing a change in climb gradient due to vertical winds includes:
   means for providing a cosine signal corresponding to the cosine of said roll angle of said aircraft, for providing a product signal by multiplying said cosine signal by a signal representing said angle of attack, and for differencing said product signal and a signal representing said pitch attitude, thereby to form a signal representing said aerodynamically derived flight path.

9. The system of claim 6, further comprising:
   means for generating a corrected loss of performance signal optimized for threshold detection, including:
   a. means for limiting the magnitude of said loss of performance signal, and
   b. means for amplifying said loss of performance signal in accordanced with a power function.

10. The system of claim 9, wherein said loss of performance signal changes at an ascertainable rate of change and said means for generating a corrected loss of performance signal further includes means for limiting the rate of change of said loss of performance signal.

11. The system of claim 6, further comprising:
   means for scaling said loss of performance signal in accordance with the climb capabilities of the aircraft.

12. The system of claim 6, further comprising:
   means for providing a visible or audible warning to the aircraft pilot when said loss of performance signal exceeds a predetermined threshold level.

13. A method for detecting windshear and related vertical wind conditions and forming a signal indicative thereof when such conditions are encountered by an aircraft in flight, comprising the steps of:
   generating from aerodynamic data input signals corresponding to a forward acceleration, a downward acceleration, and a flight path of the aircraft;
   generating from inertial data input signals corresponding to said forward acceleration, said downward acceleration, and said flight path of the aircraft;
   differencing said aerodynamically derived forward acceleration, downward acceleration, and flight path signals and said respective inertially derived forward acceleration, downward acceleration, and the flight path signals, thereby to form a foward windshear signal from the forward acceleration signals, a downward windshear signal from said downward acceleration signals, and a change in climb gradient due to vertical winds signal from said flight path signals;
   correcting said forward and downward windshear signals for pitch rate induced corilis accelerations to form respective corrected forward and downward windshear signals;
   generating from said corrected forward and downward winshear signals a signal corresponding to a change in climb gradient due to longitudinal windshear along a horizontal heading axis of said aircraft; and summing said change in climb gradient due to longitudinal windshear signal and said change in climb gradient due to vertical winds signal, thereby to form an overall aircraft loss of performance signal.

14. The method of claim 13, wherein said aircraft in flight is characterized by an angle of attack and forward airspeed and said step of generating input signals from aerodynamic data includes:
forming a tangent signal representing the tangent of said angle of attack of said aircraft,
multiplying said tangent signal by a signal representing said forward airspeed of said aircraft to generate a downward airspeed signal; and
differentiating said downward airspeed signal to generate said aerodynamically derived downward acceleration signal.

15. The method of claim 13, wherein said aircraft in flight is characterized by an angle of attack, a roll angle, and a pitch attitude and said step of generating input signals from aerodynamic data includes:
forming a corrected angle of attack signal representing said angle of attack of said aircraft modified in accordance with said roll angle of said aircraft, and
differencing said corrected angle of attack signal and a signal representing said pitch attitude of said aircraft, thereby to generate said aerodynamically derived flight path signal.

16. The method of claim 13 wherein said loss of performance signal has a magnitude and said method further includes limiting said magnitude of said loss of performance signal and amplifying it in accordance with a power function, thereby to optimize said signal for threshold detection purposes.

17. An avionics system for generating a signal indicative of a windshear condition encountered by an aircraft in flight, comprising:
means for generating an aerodynamic flight path signal and a measured airspeed signal representing, respectively, an aerodynamic flight path and an airspeed of said aircraft;
means for generating a horizontal aerodynamic acceleration signal representing a horizontal aerodynamic acceleration of said aircraft by multiplying said measured airspeed signal and said aerodynamic flight path signal;
means for generating an inertial acceleration signal representing a horizontal inertial acceleration of the aircraft along its heading axis; and
means for generating a longitudinal windshear signal by differencing said horizontal aerodynamic acceleration signal and said inertial acceleration signal.

18. The system of claim 17, further comprising:
means for generating an inertial flight path signal representing an inertial flight path of said aircraft;
means for differencing said aerodynamic flight path signal and said inertial flight path signal, thereby to form a signal representing a change in climb gradient due to vertical wind;
means for converting said longitudinal windshear signal to a signal representing a change in climb gradient due to longitudinal windshear; and means for forming an overall aircraft loss of performance signal by summing said change in climb gradient due to longitudinal windshear signal with said change in climb gradient due to vertical wind signal.

19. The system of claim 17, wherein said aircraft in flight is characterized by an angle of attack and a pitch attitude and wherein said means for generating said aerodynamic flight path signal includes means for differencing a signal proportional to said angle of attack of said aircraft and a signal representing said pitch attitude of said aircraft.

20. The system of claim 17, wherein said means for generating said horizontal aerodynamic acceleration signal includes:
means for generating a flight path cosine signal representing the cosine of said aerodynamic flight path signal,
means for generating a horizontal aerodynamic airspeed signal representing a horizontal aerodynamic airspeed of the aircraft by multiplying said flight path cosine signal by said measured airspeed signal, and
means for differentiating said horizontal aerodynamic airspeed signal thereby to form said horizontal aerodynamic acceleration signal.

21. A method for forming a signal indicative of loss of performance of an aircraft due to longitudinal windshear and related conditions encountered by said aircraft in flight, comprising the steps of:
generating an aerodynamically derived signal corresponding to a horizontal acceleration of said aircraft along its heading axis;
generating an inertially derived signal corresponding to a forward acceleration of said aircraft along its heading axis; and
differencing said horizontal aerodynamic acceleration signal and said forward inertial acceleration signal to form a windshear signal that represents longitudinal windshear and is indicative of said loss of performance of said aircraft.

22. The method of claim 21, wherein said aircraft in flight is characterized by a flight path and wherein the method further comprises the steps of:
generating an aerodynamically derived signal corresponding to said flight path of said aircraft;
generating an inertially derived signal corresponding to said flight path of said aircraft;
differencing said aerodynamic flight path signal and said inertial flight path signal to form a change in climb gradient due to vertical winds signal indicative of the effects of vertical winds on the performance of said aircraft;
transforming said windshear signal into a change in climb gradient due to longitudinal windshear signal; and
summing said change in climb gradient due to longitudinal windshear signal and said change in climb gradient due to vertical winds signal to form a signal indicative of the overall loss of performance of said aircraft due to longitudinal windshear and vertical wind conditions.

* * * * *

UNITED STATES PATENT AND TRADEMARK OFFICE
CERTIFICATE OF CORRECTION

PATENT NO. : 4,853,861

DATED : August 1, 1989

INVENTOR(S) : Douglas W. Ford, et al.

It is certified that error appears in the above-identified patent and that said Letters Patent is hereby corrected as shown below:

Column 1, line 27, change "land" to --landing--.

Column 5, line 67, after "$WSH_D$ and" insert --forward windshear $WSH_F$ signals. The signals $WSH_D$ and--.

Columns 7, lines 13-14, after "gravitational" insert --acceleration constant g and generates a signal--.

Column 9, line 10, change ". the" to --. The--.

Claim 9, column 12, line 26, change "accordanced" to --accordance--.

Claim 13, column 12, line 63, change "corilis" to --coriolis--.

UNITED STATES PATENT AND TRADEMARK OFFICE
CERTIFICATE OF CORRECTION

PATENT NO. : 4,853,861

DATED : August 1, 1989

INVENTOR(S) : Douglas W. Ford, et al.

It is certified that error appears in the above-identified patent and that said Letters Patent is hereby corrected as shown below:

Claim 14, column 13, line 8, after "attack and" insert --a--.

Signed and Sealed this

Thirty-first Day of July, 1990

Attest:

HARRY F. MANBECK, JR.

Attesting Officer

Commissioner of Patents and Trademarks